(12) United States Patent
Ono

(10) Patent No.: US 6,272,167 B1
(45) Date of Patent: Aug. 7, 2001

(54) SPREAD SPECTRUM COMMUNICATION SYSTEM

(75) Inventor: Shigeru Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/133,247

(22) Filed: Aug. 13, 1998

(30) Foreign Application Priority Data

Aug. 13, 1997 (JP) .................................................... 9-218559

(51) Int. Cl.[7] .............................. H04B 15/00; H04K 1/00
(52) U.S. Cl. ..................... 375/144; 375/147; 375/150; 375/347; 370/335; 370/342; 455/137
(58) Field of Search .................................. 375/144, 145, 375/147, 148, 149, 150, 347; 370/335, 342, 441, 440, 491; 455/137, 506, 63, 65

(56) References Cited

U.S. PATENT DOCUMENTS

| | | | |
|---|---|---|---|
| 5,724,378 | * 3/1998 | Miki et al. | 375/200 |
| 5,809,062 | * 9/1998 | Hulbert | 375/206 |
| 6,032,026 | * 2/2000 | Seki et al. | 455/63 |
| 6,081,516 | * 6/2000 | Yoshida et al. | 370/342 |
| 6,097,711 | * 8/2000 | Okawa et al. | 370/335 |

FOREIGN PATENT DOCUMENTS

| | | |
|---|---|---|
| 8335898 | 12/1996 | (JP) . |
| 8335899 | 12/1996 | (JP) . |
| 10-1126673 | * 4/1998 | (JP) . |
| 10-303856 | * 11/1998 | (JP) . |
| 10-336072 | * 12/1998 | (JP) . |

OTHER PUBLICATIONS

Office Action Issued by the Japanese Patent Office in the Corresponding Application on Nov. 17, 1998 and an English Translation thereof.

J. Viterbi, *CDMA: Principles of Spread Spectrum Communication*, Addison–Wesley Publishing Company, p. 89, 1995.

H. Ando, et al., *Performance of RAKE and Space Diversity using Multi–pilot–block Channel Estimation for DS–CDMA*, 1997, IEICE General Conference, B–5–13.

A. Higashi, et al., *Performance of Coherent RAKE Detection using Interpolation of DS/CDMA*, Technical Report of IEICE, RCS94–98, pp. 57–62, 1994.

S. Seo, et al., *An Investigation on SIR Measurement Methods in Adaptive Transmit Power control for DS–CDMA*, 1996, IEICE, Communications Society Conference, B330.

\* cited by examiner

*Primary Examiner*—Stephen Chin
*Assistant Examiner*—Mohammad Ghayour
(74) *Attorney, Agent, or Firm*—Ostrolenk, Faber, Gerb & Soffen, LLP

(57) ABSTRACT

A correlation unit 100 de-spreads reception signal in a reception physical channel and a physical channel for channel estimation with a de-spread timing signal designated by a path control unit 330 and supplies the portions of reception symbols in the de-spread reception signal, corresponding to the pilot symbols and the reception symbols corresponding to the reception physical channel, to weighting coefficient estimation units 120 and a weighting circuit 130, respectively. The weighting coefficient estimation unit 120 carries out channel estimation corresponding to paths for individual finger units 200-1 through 200-8. The weighting circuit 130 multiplies a complex conjugate of the estimated weighting coefficient by the reception signal to produce the multiplication result to a RAKE combiner unit 400. The RAKE combiner unit 400 carries out maximum-ratio combining of the weighted reception signals supplied from the finger units 200-1 through 200-8 and produces the combination result via an output terminal 600.

1 Claim, 1 Drawing Sheet

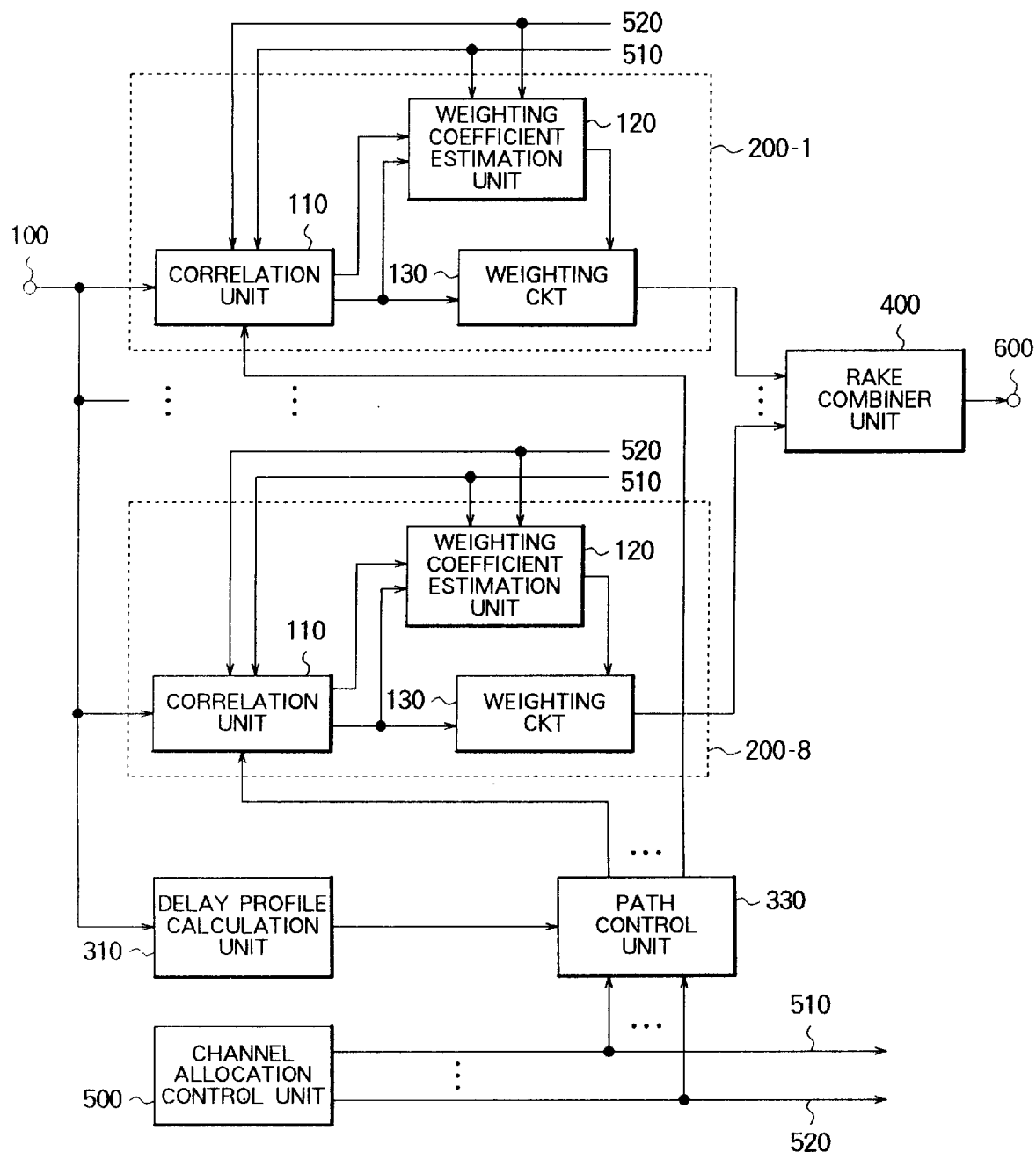

SPREAD SPECTRUM COMMUNICATION SYSTEM

BACKGROUND OF THE INVENTION

The present invention relates to a mobile communication network system and, more particularly, to a spread spectrum communication system in which predetermined pilot symbols are time-multiplexed into a radio signal in each of physical channels.

Spread spectrum communication systems have a good interference canceling function to minimize or even eliminate blocking and fading. Thus, a radio signal is received with excellent characteristics on a multi-path environment. Such systems have been examined in recent years on their applicability to mobile communications. Since the spread spectrum communication systems have high spread frequency, the multi-path propagation paths are distinguished from each other and a RAKE reception system can be applied. The RAKE reception system is a scheme that provides a path diversity effect. More specifically, RAKE reception system separates the multi-path propagation paths and estimates propagation path characteristic of each path. Then, compensation operation of the propagation path characteristics is carried out to each of the reception signals of each of the paths. Maximum-ratio combining or common-mode combining of compensated propagation path characteristics is carried out. The RAKE reception system comprises a finger unit which carries out cancel process of the propagation path characteristics by carrying out estimation of the channel characteristics of the multi-path propagation paths and carrying out multiplication by the use of complex conjugate of the estimated channel characteristics. (Andrew J. Viterbi, *CDMA: Principles of Spread Spectrum Communication*, Addison-Wesley Publishing Company, page 89, 1995 (hereinafter, referred to as an article 1). The finger unit comprises a correlation unit to de-spread the spectrum spread codes. For effective RAKE combining, the characteristics of the channel estimation in the finger unit are very important. Some systems insert predetermined pilot symbols periodically by every certain number of slots for each physical channel. For such systems, various approaches have been proposed that provide channel estimation or signal-to-interference (SIR) ratio estimation for reception signals using pilot symbols for a reception physical channel. (See, for example, H. Ando and M. Sawahashi, *Space Diversity Characteristics of Channel Estimation RAKE using DS-CDMA multi-pilot blocks*, 1997 IEICE General Conference, B-5-13 (hereinafter, referred to as an article 2); Azuma, Ohguchi, and Ohno, *Characteristics of Interpolation-type Synchronous Detection RAKE for DS/CDMA*, Technical Report of IEICE. RCS94-98, pages 57–62, 1994 (hereinafter, referred to as an article 3); and Kiyoo, Y. Okumura, and T. Doi, *Examination about SIR Measurement Method in Adaptive Power Control for DS-CDMA*, 1996 IEICE Communications Society Conference, B-330 (hereinafter, referred to as an article 4). The methods in the articles 2 and 4 provide channel estimation for a certain slot using a pilot symbol for the adjacent slot. On the other hand, the article 3 uses data contained in a certain physical channel based on a feedback decision technique for more accurate channel estimation. It is noted both methods basically use only the pilot symbol interpolated in the reception physical channel.

The above-mentioned conventional methods use the reception signals on the certain physical channel and thus have significant limitations to improvement of the characteristics on the RAKE reception and SIR estimation. In the heart of the city having towering buildings, multi-paths are often used. In this case, paths are established and released frequently. Thus, the conventional method provides a smaller Eb/No or Eb/Io ratio where Eb is a signal electric power, No is a noise electric power, and Io is interference electric power. In addition, the methods provide a smaller effect of reducing time-averaging noise level in association with the time fluctuation of the noise on the paths. This means that the small Eb/No ratio deteriorates accuracy of temporal data decision if used as in the article 3. Characteristics can thus be improved only to a limited extent. On the other hand, the techniques as in the articles 2 and 4 have limitation to the level of accuracy improvement because only a small number of slots are available due to the time fluctuation of the propagation characteristics when the symbols used are for two or more slots.

SUMMARY OF THE INVENTION

An object of the present invention is to provide a spread spectrum communication system that improves characteristics for the reception by a RAKE receiver by means of improving accuracy of channel estimation.

A spread spectrum communication system according to the present invention uses a plurality of pilot symbols for a plurality of physical channels for channel estimation depending on a reception physical channel.

The present invention provides higher channel estimation accuracy with improvement of the characteristics for the reception by the RAKE receiver. In addition, the present invention provides higher accuracy of estimation of received SIR and frequency offset.

Another aspect of a spread spectrum communication system according to the present invention comprises a plurality of finger units, each of which receives a reception signal and produces a weighted reception signal; a RAKE combiner unit for carrying out a maximum-ratio combining of the weighted reception signals from the finger units to produce a combined signal; a delay profile calculation unit for calculating a delay profile of the reception signal by using a replica of a transmission signal that is corresponding to the physical channel; and a path control unit that detects a peak output phase form the delay profile at which a peak level is obtained with a large correlation power and that converts the peak output phase into a de-spread timing signal for a phase of a reception physical channel and a phase of a physical channel for channel estimation to produce conversion results to the finger units. Each finger units comprises a correlation unit that de-spreads the reception signals in the reception physical channel and the physical channel for the channel estimation with the de-spread timing signal designated by the path control unit; a weighting coefficient estimation unit adapted to receive the portions of reception symbols in the de-spread reception signal, corresponding to the pilot symbols for the reception physical channel and for the physical channel for the channel estimation, for carrying out the channel estimation corresponding to the path allocated to the finger unit to estimate a weighting coefficient for RAKE combining; and a weighting circuit for multiplying a complex conjugate of the estimated weighting coefficient by the reception signal supplied from the correlation unit to produce multiplication result to the RAKE combiner unit.

BRIEF DESCRIPTION OF THE DRAWING

The drawing is a block diagram illustrating an embodiment of the preset invention.

DESCRIPTION OF THE PREFERRED EMBODIMENT

Referring to the drawing, a spread spectrum communication system according to a preferred embodiment of the present invention is described.

The spread spectrum communication system of this embodiment comprises first through eighth finger units 200-1 through 200-8, a delay profile calculation unit 310, a path control unit 330, a RAKE combiner unit 400, and a channel allocation control unit 500. The number of finger units is not specifically limited to eight ad it is understood that the number is of no importance in the context of the present invention. In the preferred embodiment, although the number of the physical channel is selected to one for the channel estimation, this number is not also significant in the context of the present invention.

The finger units 200-1 through 200-8 have the identical structure and function. Each finger unit comprises a correlation unit 110, a weighting coefficient estimation unit 120, and a weighting circuit 130.

An input terminal 100 is supplied with a reception signal received by an antenna (not shown). The reception signal is a two-dimensional signal defined by I (In-phase) and Q (Quadrature-phase) when QPSK modulation is used. The reception signal from the input terminal 100 is supplied to each of the correlation units 110 which are contained in the finger units 200-1 through 200-9 for de-spreading. The reception signal is also supplied to the delay profile calculation unit 310. The delay profile calculation unit 310 calculates a delay profile from the reception signal by using a replica of a transmission signal that is corresponding to the physical channel designated by the channel allocation control unit 500. It is assumed that the delay profile is represented by a correlated power value of the transmission replica and the reception signal. Integration time and segment for the delay profile calculation may be predetermined or be designated from outside depending on the reception characteristic. The integration time has an effect of compensating an instantaneous fluctuation of the path. The delay profile calculated by the delay profile calculation unit 310 is supplied to the path control unit 330 for each time unit depending on the integration time.

The path control unit 330 detects a peak output phase from the delay profile at which N number of peak levels (e.g., N=20) are obtained with a large correlation power. The peak output phase detected by the path control unit 330 is converted into phases of a reception physical channel and of a physical channel for channel estimation based on the designation from the channel allocation control unit 500. The converted phases are then supplied to the correlation units 110 in the finger units 200-1 through 200-8.

Operation of the finger units 200-1 through 200-8 is as follows. The correlation unit 110 de-spreads the reception signals in the reception physical channel and the physical channel for the channel estimation with the de-spread timing signal designated by the path control unit 330. In this event, information on the de-spreading codes is designated by the channel allocation control unit 500. The portions of the de-spread reception symbol, corresponding to the pilot symbols for the reception physical channel and the physical channel for the channel estimation, are supplied to the weighting coefficient estimation unit 120 in accordance with frame synchronization information 510 through 520 designated by the channel allocation control unit 500. The de-spread reception symbol corresponding to the reception physical channel is supplied to the weighting circuit 130.

In the weighting coefficient estimation unit 120, the certain finger unit carries out path (channel) estimation corresponding to the path associated therewith by using the method described in the article 1 or 2. The weighting coefficient estimation unit 120 then estimates a weighting coefficient for RAKE combination. More specifically, by using the pilot symbols known to both receiving and transmitting sides, the reception symbols corresponding to the pilot symbols are demodulated with the pilot symbol having an expected value. A simple average of the demodulated symbols is taken as the estimation of the weighting coefficient. The weighting coefficient is a complex vector of a transmission path of a complex vector indicative of the path characteristics. The weighting circuit 130 multiplies the complex vector of the estimated weighting coefficient by the reception signal. The multiplication result is supplied to the RAKE combiner unit 400 as the weighted reception signal. The RAKE combiner unit 400 carries out maximum-ratio combining of the weighted reception signals supplied from the finger units 200-1 through 200-8 and produces the combination result via an output terminal 600.

In the above description, a plurality of physical channels are de-spread for the respective finger units. However, this configuration is not essential for the present invention. Channel estimation may be made for the physical channels for only finger units corresponding to a phase with a high peak level, in the correlation peaks found by the path control unit 330.

As described above, the present invention carries out the channel estimation for the RAKE combining by using the pilot symbols for the control channel and/or physical channel(s) of other user(s) as well as of the reception physical channel. This allows equivalent increase of the number of the pilot symbols for the channel estimation. The accuracy of the channel estimation and, in turn, the reception characteristics in the RAKE reception can be improved by the present invention. In particular, the present invention has the advantage that the channel estimation accuracy can be improved without error deterioration due to temporally decided data nor process delay due to averaging of the slots, even when the Eb/No ratio is small.

What is claimed is:

1. A spread spectrum communication system having predetermined pilot symbols in each of a plurality of physical channels, each of said physical channels being adapted to carry a signal received by said system as a reception signal, said system comprising:

a plurality of finger units each of which receives said reception signal and produces a weighted reception signal;

a RAKE combiner unit for use in maximum-ration combining weighted reception signals from said plurality of finger units to produce a combined signal;

a delay profile calculation unit for calculating a delay profile from said reception signal by using a replica of a transmission signal that is corresponding to the physical channel; and a path control unit that detects a peak output phase from said delay profile at which a peak level is obtained with a large correlation power and that converts said peak output phase into a de-spread timing signal for a phase of a reception physical channel and a phase of a physical channel for channel estimation to produce conversion results to said plurality of finger units;

each finger unit comprising:

a correlation unit that de-spreads said reception signals in the reception physical channel and the physical channel for the channel estimation with the de-spread timing signal designated by said path control unit;

a weighted coefficient estimation unit adapted to receive the portions of reception symbols in the de-spread reception signal, corresponding t the pilot symbols for the reception physical channel and for the physical channel for the channel estimation, for carrying out channel estimation corresponding to the path allocated to the finger unit to estimate a weighting coefficient for RAKE combining; and a weighting circuit for multiplying a complex conjugate of the estimated weighting coefficient by the reception signal supplied forms aid correlation unit to produce multiplication result to said RAKE combiner unit.

* * * * *